United States Patent [19]

St. Clair

[11] Patent Number: 4,735,242

[45] Date of Patent: Apr. 5, 1988

[54] BAG PLACEMENT APPARATUS FOR SILO BAG FILLING MACHINES

[76] Inventor: Rodney D. St. Clair, Rte. 6, Box 6523, Nampa, Id. 83651

[21] Appl. No.: 56,007

[22] Filed: May 28, 1987

[51] Int. Cl.$^4$ .......................... A01F 25/16; B65G 3/04
[52] U.S. Cl. ........................................ 141/114; 141/10
[58] Field of Search ................ 141/10, 114, 313, 316; 212/225; 414/747

[56] References Cited

U.S. PATENT DOCUMENTS

| | | | |
|---|---|---|---|
| 4,002,243 | 1/1977 | Kramer | 212/225 |
| 4,050,589 | 9/1977 | Dolza | 414/747 |
| 4,480,942 | 11/1984 | Farrow | 414/747 X |
| 4,548,243 | 10/1985 | Diaz | 141/10 X |
| 4,611,642 | 9/1986 | Durhman | 141/114 |
| 4,621,666 | 11/1986 | Ryan | 141/114 |

Primary Examiner—Mark J. Thronson
Attorney, Agent, or Firm—Paul F. Horton

[57] ABSTRACT

Bag placement apparatus for silo bag filling machines of the type having a forming chamber, said apparatus comprising a bag supporting framework; an overhead winch and cable unit; a trolley; and a trolley track. The winch is supported on the trollery, which, in turn, is carried by and reciprocally movable along the horizontally extending trolley track. A silo bag is draped over the framework and then vertically lifted by the winch-cable unit. The trolley is then rolled forward over the forming chamber and the winch activated to lower the bag supporting framework onto the top of the forming chamber from where the bag is dispensed during the filling operation.

6 Claims, 1 Drawing Sheet

BAG PLACEMENT APPARATUS FOR SILO BAG FILLING MACHINES

BACKGROUND OF THE INVENTION

1. Field of the Invention

This invention relates in general to silo bag filling machines, otherwise known as bulk material compressors, and in particular the invention relates to devies for placement of silo bags over the forming chamber of such machines.

2. Description of the Prior Art

Machines for compressing food material, such as forage and grain, into large tubular plastic bags are now well known in the art, as typified by the inventor's machine as claimed in U.S. Pat. Nos. 4,655,128; and by the machines claimed in 4,484,606 issued to L. Kosters and 3,687,061 issued to A. Eggenmuller et al.

For use of such machines, a large tubular bag, accordionated upon itself is positioned surrounding the forming chamber of the machine so as to unravel to present a long sausage-shaped protective covering during the bag filling process. A problem common to all known silo bag filling machines is the placement of the empty bag onto the forming chamber for dispensing. Because of the length, diameter and thickness of the walls of the tubular bag, the bag is ungainly and of a weight which may exceed 200 pounds, and in view of the height of the forming chamber, placement over the forming chamber is very difficult.

SUMMARY OF THE INVENTION

The present invention overcomes the problems associated with placement of the bag over the forming chamber by providing bag placement apparatus including a bag supporting framework which may be placed upon the ground; a winch-cable unit for vertical lifting of the framework with bag; and a trolley-trolley track assembly for horizontal forward and rearward movement of the framework for placement of the framework and bag over the forming chamber.

It is therefore a primary object of the present invention to provide bag placement apparatus which includes a framework onto which a bag may be loaded while on the ground and which may be hoisted into a position resting upon the forming chamber of a bulk material compressing machine so that a silo bag may be dispensed therefrom.

More particularly, it is an object of the present invention to provide bag placement apparatus which includes a bag supporting framework which is supported by a winch for vertical movement and by a trolley-track assembly for horizontal movement for the placement of a silo bag over the forming chamber of a bulk material compressor.

Even more particularly, it is an object of the present invention to provide bag placement apparatus which includes a supporting framework which has an undersurface which is registerable with the top outer surface of a forming chamber for placement of the framework thereon for dispensing a silo bag.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
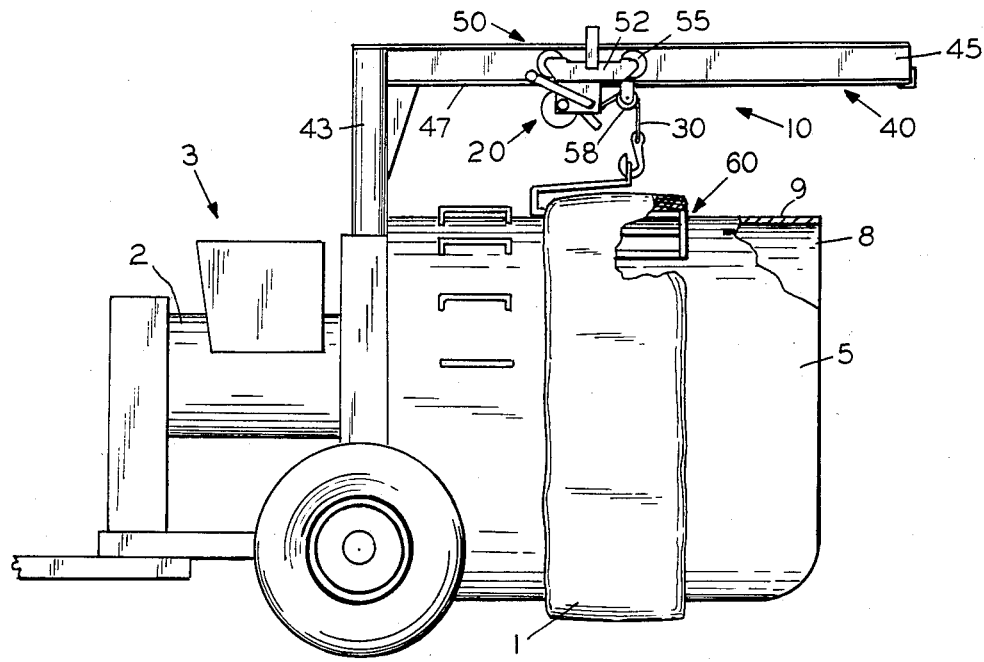
FIG. 1 is a side elevation showing the framework of the bag placement apparatus of the present invention in place over the forming chamber of a silo bag filling machine for dispensing of the tubular bag which is shown in part.

Referring now to the drawings, and more particularly to FIG. 1, an embodiment to be preferred of bag placement apparatus 10, made according to the present invention, is disclosed. Apparatus 10 includes a winch 20; a cable 30; trolley track means 40; trolley 50; and bag support means designated by the numeral 60.

Figure 2:
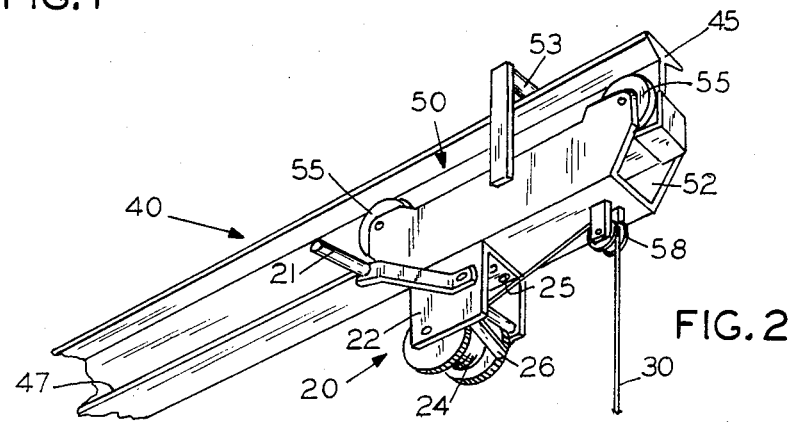
FIG. 2 is a perspective view of the winch, cable, trolley and trolley track system of the present invention.

Winch 20, shown to advantage in FIG. 2, includes a housing 22 carrying a drum 24, about which cable 30 is wound; a handle 21 for rotating the drum; and a ratchet 26 for selectively holding the drum from rotation. The winch is attached to overhanging trolley 50 by bolts 25, or by welding or the like; housing 22 of the winch being affixed to carriage 52 of the trolley. A pulley 58 may bs suspended from the rear of the trolley carriage, over which cable 30 may be threaded. A take-up and pay-out motor, not shown, may be substituted for handle 21 to rotate the drum. The cable may be fabricated of any suitable material.

Trolley 50 is provided with two sets of laterally spaced wheels 55 which are rotatably mounted to carriage 52 by support bearings. Wheels 55 roll upon and are carried by trolley track means 40. In the preferred embodiment, track means 40 includes a horizontal rail 45, in the form of an I-beam. Rail 45 is mounted at a suitable height over forming chamber 5 of machine 3 by means of vertical standard 43 which is secured to the machine. The lower lateral flanges 47 of the rail provide support for wheels 55 to enable the trolley, and hence winch 20, to move forward, i.e., toward auger tube 2 of the machine, or to move rearward, i.e. 1, toward the back opening 8 of forming chamber 5. Handle 53, attached to one side of carriage 52 and extending over the top of the carriage is used to move the trolley. Lock means, not shown, may be provided upon the trolley to lock the trolley in a given forward or rearward position.

Figure 3:
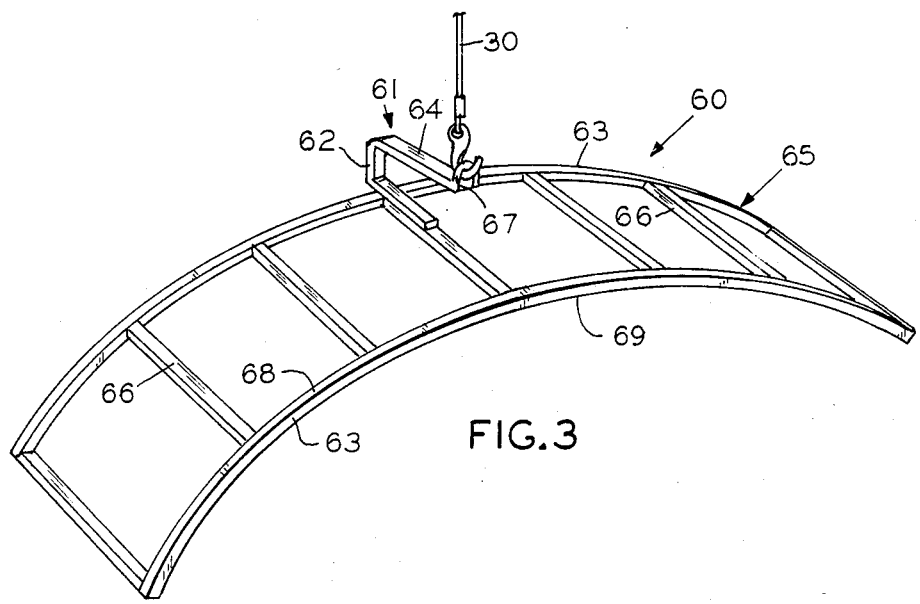
FIG. 3 is a perspective view of the bag supporting framework of the present invention.

Bag support means 60, as may be seen in FIGS. 1 and 3, includes a framework 65, preferably in the form of a lattice. The framework is provided with a pair of parallel end bars 63 which are curved to fit the top outer surface 9 of forming chamber 5, as will hereinafter be more fully explained. A plurality of cross bars 66 extend between the end bars to provide a strong yet light weigth structure. The undersurface 69 of the framework is formed to be in registry with the top outer surface of the forming chamber so as to fit snugly thereupon. The conventional shape of the outer surface of forming chambers is convex and therefore the undersurface of the framework is concave, as shown. Bag support means 60 also includes a cable arm 61 including a substantially C-shaped, vertically upstanding membert 62 and a horizontally oriented bar or tube member 64 which is vertically spaced above the framework. Member 64 is provided with attachment means 67, preferably in the form of a ring, for attachment of cable 30. The cable is attached to cable arm 61 at the substantial gravitational center of the framework to prevent excessive tilting of the framework during the bag lifting procedure. The C-shaped member 62, in cooperation with horizontal member 64, permits silo bag 1 to be placed over the framework without obstruction; the interior surface of the tubular bag engaging the top surface 68 of framework 65.

For placement of a silo bag onto machine 3, and assuming that cable 30 is extended with bag support means 60 resting upon the ground in back of forming chamber 5 of the machine, silo bag 1 is draped over framework 65. It will be noted that the accordionated bag may be slipped over the top of the entire framework without interference of the cable in its attachment to the cable arm. The winch, which is positioned at the rear end of rail 45 by means of trolley 50, is then activated by rotation of handle 21 or by activation of a motor, if available, to rotate drum 24 to wind the cable about the drum, thus lifting bag support means 60 which holds bag 1. Because of attachment of cable 30 at the gravitational center of the support means, there is little tilting of the framework. Once the framework is hoisted to a vertical level above the top outer surface 9 of forming chamber 5, ratchet 26 is set to hold the drum from further rotation and to suspend the bag support means in place. Trolley 50 is then pulled forward by trolley handle 53 to the position shown in FIG. 1 while the bag is simultaneously fitted over and caused to surround the entire forming chamber 5. Ratchet 26 is then disengaged and framework 65 lowered to rest on the top surface of the forming chamber with the undersurface 69 of the framework in engagement with top outer surface 9 of the chamber. In this position, the bag is ready for dispensing during the filling process. Once the entire bag has been filled, the bag support means may be lifted by the winch, the trolley moved rearward, and support means 60 lowered to the ground for placement of another bag thereupon. During storage or during transportation of machine 3 from one site to another, the bag support means continues to rest upon the forming chamber.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Bag placement apparatus, said apparatus comprising:

a silo bag filling machine, said machine having a material forming chamber;

a trolley track affixed to said machine, said track being located above the forming chamber of the machine;

a trolley carried on said track for forward and rearward movement of said trolley;

a winch carried by said trolley;

a cable carried by said winch; and bag support means affixed to said cable, said bag support means including a framework over which a silo bag is draped, for placement of the framework and bag over the forming chamber of the machine.

2. The apparatus as described in claim 1 wherein said trolley track includes a vertical standard affixed to the machine and a horizontal rail affixed to said standard, said rail vertically spaced from and extending rearwardly over the forming channel of the machine.

3. The apparatus as described in claim 1 wherein said framework of said bag support means includes an undersurface registerable with the top surface of the forming chamber of the machine for placement of the framework thereupon.

4. The apparatus as described in claim 1 wherein said bag support means further includes a cable arm extending from one end of said framework to a vertically spaced position over substantially the gravitational center of said framework for attachment of said cable to prevent tilting of said framework when hoisted by said winch.

5. Bag placement apparatus, said apparatus comprising:

a silo bag filling machine, said machine having a material forming chamber;

a bag support means;

a trolley track including a horizontal rail affixed to the machine and vertically spaced above the forming chamber of the machine for placement of said bag support means there beneath;

a trolley mounted on said rail;

a winch carried by said trolley;

a cable carried by said winch;

said bag support means being affixed to said cable;

said winch operable to vertically lift and lower said bag support means by said cable and said trolley operable to move said winch, and hence said bag support means, horizontally for placement of said bag support means on said forming chamber for dispensing of a bag therefrom.

6. Bag placement apparatus as described in claim 5 wherein said bag support means includes a framework over which a silo bag may be draped and a cable arm extending from one end of said framework to a vertically spaced position over substantially the gravitational center of said framework for attachment of said cable to prevent tilting of said framework when hoisted by said winch.

* * * * *